US012679426B2

(12) United States Patent
Zhou et al.

(10) Patent No.: US 12,679,426 B2
(45) Date of Patent: Jul. 14, 2026

(54) ACTIVE PERCEPTION SYSTEM FOR DOUBLE-AXLE STEERING CAB-LESS MINING VEHICLE

(71) Applicant: Beihang University, Beijing (CN)

(72) Inventors: Bin Zhou, Beijing (CN); Yang Chen, Beijing (CN); Guizhen Yu, Beijing (CN); Zixuan Li, Beijing (CN); Zhangyu Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 594 days.

(21) Appl. No.: 18/123,455

(22) Filed: Mar. 20, 2023

(65) Prior Publication Data

US 2023/0406366 A1 Dec. 21, 2023

(30) Foreign Application Priority Data

Jun. 15, 2022 (CN) ........................ 202210747983.X

(51) Int. Cl.
B61D 11/00 (2006.01)
G05D 1/00 (2024.01)

(52) U.S. Cl.
CPC ........... B61D 11/00 (2013.01); G05D 1/0088 (2013.01); G05D 1/0214 (2013.01); G05D 1/024 (2013.01); G05D 1/0274 (2013.01)

(58) Field of Classification Search
CPC .... B61D 11/00; G05D 1/0088; G05D 1/0214; G05D 1/024; G05D 1/0274; G05D 1/242;
(Continued)

(56) References Cited

U.S. PATENT DOCUMENTS

2018/0302151 A1* 10/2018 Rosenband .......... H01Q 1/3275
2019/0163192 A1* 5/2019 Takeda ...................... B60P 1/04
(Continued)

FOREIGN PATENT DOCUMENTS

CN 111242041 A * 6/2020 ........... G06F 18/214
CN 112990049 A * 6/2021 ............. G06F 18/23
(Continued)

OTHER PUBLICATIONS

English Translation of CN113359752A (Year: 2025).*
(Continued)

*Primary Examiner* — Erin M Piateski
*Assistant Examiner* — Eisen Yim
(74) *Attorney, Agent, or Firm* — Carter, DeLuca & Farrell, LLP

(57) ABSTRACT

The present disclosure discloses an active perception system for a double-axle steering cab-less mining vehicle. The adaptive perception system includes: an environment perception mapping module, a single-frame target detection module, a multi-frame data association module, a cloud control platform, a decision-making and planning module, and a vehicle control module. The double-axle steering autonomous driving mining vehicle can be actively adjusted to be in a forward advancing mode or a backward advancing mode according to the driving mode and comprehensive information of a sensor. The system improves working efficiency of mining area, and solves the problems of large perception blind area and high risk during turning, uphill and downhill of an existing autonomous driving perception system.

5 Claims, 4 Drawing Sheets

(58) Field of Classification Search
CPC .. G05D 1/2465; G05D 1/617; G05D 2105/28;
G05D 2107/73; G05D 2109/10; G01S
17/86; G01S 17/89; G01S 17/931; B60W
60/001; B60W 30/182; B60W 50/00;
B60W 50/0098; B60W 2050/0019; B60W
2050/0028; B60W 2300/12; B60W
2420/403; B60W 2420/408; B60W
2520/10; B60W 2552/15; B60W 2556/45
See application file for complete search history.

(56) References Cited

U.S. PATENT DOCUMENTS

| | | | | |
|---|---|---|---|---|
| 2020/0029490 | A1* | 1/2020 | Bertucci | A01B 79/005 |
| 2020/0064483 | A1* | 2/2020 | Li | G01S 13/867 |
| 2020/0202175 | A1* | 6/2020 | Hieida | G06T 7/00 |
| 2020/0379456 | A1* | 12/2020 | Ko | G01S 17/86 |
| 2022/0063659 | A1* | 3/2022 | Johnson-Roberson | G01C 25/00 |
| 2023/0061682 | A1* | 3/2023 | Gade | B60W 50/0098 |
| 2024/0385315 | A1* | 11/2024 | Lunn | G01S 17/931 |

FOREIGN PATENT DOCUMENTS

| | | | | | |
|---|---|---|---|---|---|
| CN | 113359752 | A | * | 9/2021 | G05D 1/0246 |
| CN | 111551958 | B | * | 4/2022 | G06F 18/23213 |

OTHER PUBLICATIONS

English Translation of CN112990049A (Year: 2025).*
English Translation of CN111551958B (Year: 2025).*
English Translation of CN111242041A (Year: 2025).*

* cited by examiner

$$\frac{ke^{-\tau x}}{s(Ts+1)}$$

ACTIVE PERCEPTION SYSTEM FOR DOUBLE-AXLE STEERING CAB-LESS MINING VEHICLE

CROSS REFERENCE TO RELATED APPLICATION

This patent application claims the benefit and priority of Chinese Patent Application No. 202210747983.X, filed with the China National Intellectual Property Administration on Jun. 15, 2022, the disclosure of which is incorporated by reference herein in its entirety as part of the present application.

TECHNICAL FIELD

The present disclosure relates to the technical field of autonomous driving, and in particular, to an active perception system for a double-axle steering cab-less mining vehicle.

BACKGROUND

In recent years, with the rapid development of artificial intelligence and the new generation of information technology, the key technologies of autonomous driving have been further improved. Characterized with relatively simple and closed environment, the open-pit mining area has become one of the scenes where autonomous driving has been quickly implemented. The existing autonomous driving process in the mining area has the following problems. First, because the cab occupies the space of the mining vehicle, it is difficult to increase the single operation volume of the mining vehicle. Second, the mining vehicle needs to turn around frequently in the loading and unloading area, which leads to the decrease of mining operation efficiency. In addition, due to the large volume of the mining vehicle, there are many blind areas when the vehicle goes up and down hills and turns, which leads to the deterioration of the perception performance of the autonomous driving perception system of the vehicle.

The key technologies of autonomous driving can be divided into three categories: environment perception, planning and decision-making, and tracking control. Specifically, the environment perception system serves as the basis of the autonomous driving system. The double-axle steering vehicle has front and rear steering axles, such that the steering of the vehicle can be achieved without backup. The driverless driving system in the mining area can improve the operation efficiency.

The autonomous driving vehicle perception system applicable to double-axle steering shall include at least two driving modes: a forward advancing mode and a backward advancing mode, regardless of the forward and backward direction of the vehicle. To date, there has been no relevant research on the double-axle steering vehicle perception system.

In addition, most of the existing autonomous driving perception systems adopt the approach of passive perception, and the deployed fixed sensor has a limited detection range. The active perception system realizes adaptive change of the sensor perception angle based on the vehicle steering angle, drivable area information and the output angle of the slope sensor. This can effectively reduce the blind area of perception and improve the perception ability of the perception system.

Furthermore, the target fusion module evaluates the risk using the Bayesian estimation algorithm, and feeds back the calculated information entropy to reduce the driving risk of autonomous driving vehicles and improve the reliability and safety of the perception system.

The Chinese patent publication CN113665500A, entitled an environment perception system and method for a driverless transport vehicle for all-weather operation, realizes the environment perception system for a driverless transport vehicle for all-weather operation through multi-sensor fusion. The system constructs a multi-sensor two-dimensional (2D) grid map for structured roads and then generates a 2D fusion grid map through decision-level fusion. The present disclosure only uses the fusion algorithm to perceive and build the map of structured road environment, without optimizing the perception hardware system. After the drivable area is extracted, only the road in front of the car can be perceived, which lacks practicability and real-time performance for perception of the multi-turn and multi-uphill and downhill environment of mining area transportation. The adaptive perception system of the present disclosure compensates the blind area when the vehicle turns and goes up and down hills under a full load in the mining area by adaptively changing the detection direction of the sensor, so as to ensure the safety and reliability of the autonomous driving in the mining area.

The Chinese patent publication CN113551662A, entitled a perception method and dynamic perception device applied to an autonomous driving vehicle, establishes a dynamic perception system to improve the perception performance through integration of comprehensive data and the data of the region of interest (ROI). The dynamic perception system determines the ROI through the comprehensive data, so as to determine the rotation direction of the movable sensor. This method is mainly aimed at the dynamic perception optimization of the urban structured road. Moreover, the sensor rotation based on the comprehensive data has limitations, which cannot be adapted to the double-axle steering autonomous driving vehicle operating on the mining road. The adaptive perception system proposed by the present disclosure accurately controls the rotation direction of the sensor through the drivable area and planning feedback information, and compensates the blind area when the vehicle turns and goes up and down hills under a full load in the mining area, so as to ensure the safety and reliability of the autonomous driving in the mining area.

SUMMARY

An objective of the present disclosure is to overcome shortcomings and deficiencies of the prior art, and provide an autonomous driving perception system for a double-axle steering vehicle, which improves working efficiency of a mining area, and solves the problems of large perception blind area and high risk during turning, uphill and downhill of an existing autonomous driving perception system. The present disclosure adopts the following technical solutions.

An active perception system for a double-axle steering cab-less mining vehicle includes: an environment perception mapping module, a single-frame target detection module, a multi-frame data association module, a cloud control platform, a decision-making and planning module, and a vehicle control module.

The environment perception mapping module is configured to build a three-dimensional (3D) perception map and extract ROI by marking an unstructured road boundary.

The single-frame target detection module is configured to detect single-frame data by each sensor detection module, including but not limited to Euclidean clustering-based millimeter wave radar detection, depth learning algorithm-based lidar detection and depth learning algorithm-based camera detection.

The multi-frame data association module is configured to predict a risk index of each detection target by calculating an information entropy of each sensor and acquiring indicators such as a mark, speed and distance of the target, and determine a state of an obstacle after the risk index feeds back on the information entropy.

The cloud control platform is configured to receive perceived environmental data and transmit the data to the decision-making and planning module.

The decision-making and planning module is configured to determine a speed, slope and steering angle of the vehicle through a corresponding planning algorithm, transmit the above information to the vehicle control module for vehicle control, and feed back the above information to control a rotation direction of each sensor adaptively, so as to increase an effective perception and detection range.

The vehicle control module is configured to actively adjust the vehicle to a forward advancing mode or a backward advancing mode according to the driving mode and comprehensive information of the sensor.

Further, the double-axle steering autonomous driving mining vehicle has the forward advancing mode and the backward advancing mode. In the forward advancing mode, a sensor at the front of a vehicle body is taken as a main sensor, and the forward advancing mode is started when the vehicle moves from a loading area to an unloading area under a full load. In the backward advancing mode, a sensor at a rear of the vehicle body is taken as a main sensor, and the backward advancing mode is started when the vehicle moves from the unloading area to the loading area under a no-load state.

Further, the adaptive perception system includes a forward sensor component and a backward sensor component with the same configuration. Each of the sensor components includes at least a slope sensor, a global navigation satellite system/inertial measurement unit (GNSS/IMU), a Lidar, a camera, a millimeter wave radar, and a rotation angle receiving module and rotation angle control module of each sensor.

Further, the environment perception mapping module includes an equipment installation and calibration module, a point cloud map generation module, and a drivable area extraction module.

The equipment installation and calibration module is configured to arrange two sets of Lidars, millimeter wave radars and cameras at the front and rear of a double-axle steering autonomous driving mining vehicle body and a GNSS/IMU and a slope sensor on the vehicle body, and calibrate the Lidar and the GNSS/IMU to obtain a positioning relationship between a vehicle body coordinate system and a world coordinate system.

The point cloud map generation module is configured to establish a local world map with a global positioning system (GPS) of a first waypoint as an origin, determine a conversion matrix by Lidar and vehicle GNSS/IMU calibration information by inputting the GPS and Lidar data, convert GPS information of a point cloud at every moment into the world coordinate system, and perform front-end iterative closest point (ICP) matching and back-end extended Kalman filter (EKF) optimization processing on the point cloud to form a local point cloud map.

The region of interest (ROI) extraction module is configured to extract the unstructured road boundary based on a point cloud normal vector, distinguish a relatively vertical ground normal vector and a relatively inclined retaining wall normal vector, and extract a ROI boundary through orientation features of the normal vector, so as to generate a ROI.

Further, the single-frame target detection module includes a data obtaining module, an adaptive angular rotation module, a Euclidean clustering extraction-based millimeter wave radar detection target information module, a deep learning algorithm extraction-based Lidar detection target information module, and a deep learning algorithm extraction-based camera detection target information module.

The data obtaining module is configured to receive point cloud information of a drivable area and speed, slope and steering angle information of the vehicle, and obtain data output by a millimeter wave radar, a Lidar and a camera.

The adaptive angular rotation module is configured to determine a rotation angle of the sensor according to the steering angle information of the vehicle combined with the point cloud information of the ROI and control the rotation angle of each sensor by a rotation angle control module, and determine the rotation angle of the sensor according to an output value of a slope sensor when a vehicle body is tilted or a center of gravity shifts and compensate a visual field blind area caused by a pitch angle of the vehicle.

The Euclidean clustering extraction-based millimeter wave radar detection target information module is configured to perform Euclidean clustering on a point cloud on a road after ground information is removed from the drivable area, specifically, randomly selecting target points and putting the target points into a cluster if a distance between current points is less than a threshold, otherwise, selecting other points for judgment, continuing to repeat the above operations until there are no points with a distance less than the threshold, and outputting a clustering result.

The deep learning algorithm extraction-based Lidar detection target information module is configured to cut an original point cloud into grids from a perspective of a top view, pillarize a 3D point cloud, represent a point cloud in each Pillar by a 9-dimensional vector, input the point cloud into a PointNet feature extraction network to generate a 2D pseudo-image, input the pseudo-image into a 2D convolutional neural network (CNN) to further extract point cloud features, perform BoundingBox regression through a single-shot detector (SSD) head and output a position and orientation of the obstacle.

The deep learning algorithm extraction-based camera detection target information module is configured to enhance an image using Mosaic data, change a size and position of a truth value target, input the enhanced image into the network, unify the size of the image using a Focus module, extract deep semantic information and shallow spatial information of the image through an improved residual network, and accurately detect a category and position of the target under three scales through a feature pyramid network.

Further, the multi-frame data association module includes a target fusion module and a risk level prediction module.

The target fusion module is configured to generate a detection target list according to single-frame target detection information and fuse target features output by each sensor by a Bayesian method to obtain a consistent interpretation of the target, calculate a likelihood probability $P(E|H_i)$ of an observed feature E of the sensor when a given hypothesis $H_i$ is true, compare an observed value with a predetermined threshold $th_i$, a number of expected targets, feature matching and quality of feature matching, and analyze the above data to determine the value of a likelihood function which represents the confidence of the target $a_j$.

The risk level prediction module is configured to input all relevant factors into an inference machine which repeatedly infers through an algorithm and related rules in a knowledge base by using an expert system and taking a target speed, a vehicle body speed, a tag value, and a position of the target relative to a vehicle body as evaluation criteria, and determine whether a detection risk level is high and actively update the confidence of the target $a_j$ if a risk score of the target output by the expert system is greater than a risk level threshold.

Compared with the prior art, the present disclosure has the following beneficial effects:

The active perception system for a double-axle steering cab-less mining vehicle is provided. The mode design is performed according to the characteristics of double-axle steering vehicles and mining environment. Two modes are proposed for mining vehicles, and the steering mechanism under each mode is set to improve the working efficiency and stability of the mining area.

A perception method based on decision-making and planning feedback information is provided. The feedback information mainly includes vehicle steering angle information and the slope sensor, which effectively reduces the perception blind area when the vehicle goes up and down hills and turns, and improves the perception ability of the perception system.

A Bayesian fusion algorithm is provided for risk assessment using the expert system. According to the obtained risk level, the detection target is perceived actively to improve the confidence of the target, so as to reduce the driving risk of the autonomous driving vehicle and improve the reliability and safety of the perception system.

Other features and advantages of embodiments of the present disclosure are described in detail in the subsequent specific implementation part.

BRIEF DESCRIPTION OF THE DRAWINGS

The accompanying drawings are provided for further understanding of the embodiments of the present disclosure, and constitute a part of the specification. The accompanying drawings and the following specific implementations are intended to explain embodiments of the present disclosure, rather than to limit the embodiments of the present disclosure.

FIG. 4 is a schematic diagram of the influence of a vehicle body yaw angle on the perception range of the sensor;

FIG. 5 is a diagram of the stepper motor control system;

DETAILED DESCRIPTION OF THE EMBODIMENTS

Figure 1:
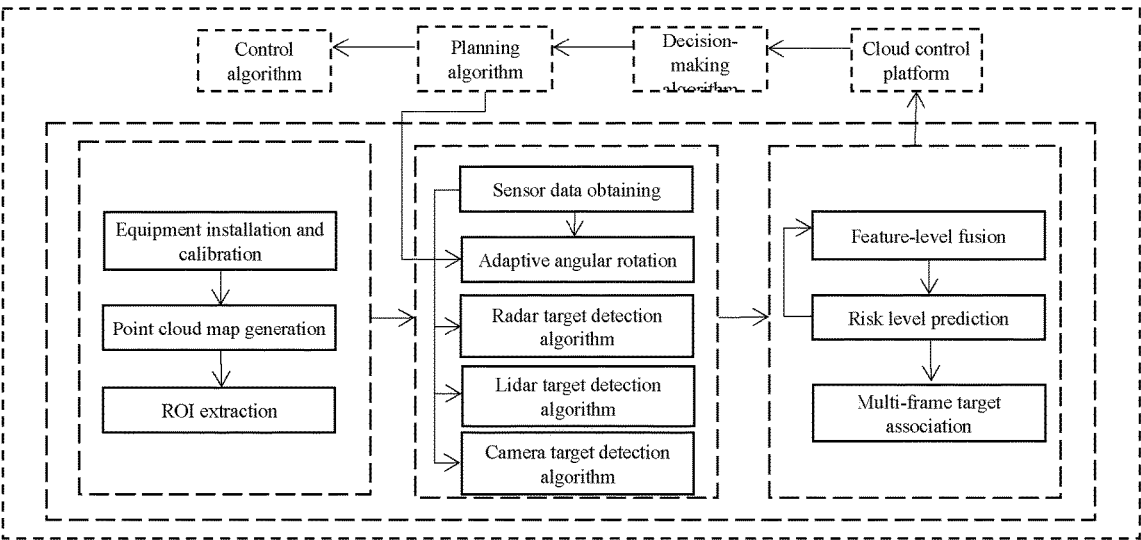
FIG. 1 is an overall architecture diagram of the active perception system.

In the driving process of a vehicle, the perception system can actively adjust the front and rear wheel steering according to the driving mode and the comprehensive information of the sensor. For example, when the vehicle is fully loaded, the uphill goods move down, the front weight of the vehicle is less than the rear weight, and the vehicle tilts back, is prone to oversteering, and is adaptively adjusted to rear wheel steering. When the downhill goods move forward, the front weight of the vehicle is greater than the rear weight, and the vehicle is prone to understeering, and is adaptively adjusted to front wheel steering. An adaptive perception system for a double-axle steering autonomous driving mining vehicle is provided with the following modules.

(1) Environment Perception Mapping Module:

Step I: Equipment Installation and Calibration

Two sets of Lidars, millimeter wave radars and cameras are arranged at the front and rear of a double-axle steering autonomous driving mining vehicle body, a GNSS/IMU and a slope sensor are arranged on the vehicle body, and the Lidar and the GNSS/IMU are calibrated to obtain a positioning relationship between a vehicle body coordinate system and a world coordinate system.

Step II: Point Cloud Map Generation

A local world map is established with a GPS of a first waypoint as an origin. The GPS and Lidar data are input synchronously. The GPS of the vehicle at every moment is converted into the world coordinate system. A conversion matrix is determined by Lidar and vehicle IMU calibration information, and GPS information of a point cloud at every moment is converted into the world coordinate system. The point cloud at every moment is subjected to front-end ICP matching and back-end EKF optimization processing to form a local point cloud map.

Step III: ROI Extraction

The unstructured road boundary is extracted based on a point cloud normal vector. The ground normal vector is relatively vertical, while the retaining wall normal vector is relatively inclined. A boundary is extracted through orientation features of the normal vector, so as to generate a drivable area.

(2) Single-Frame Target Detection Module:

Step I: Data Obtaining

Point cloud information of a ROI, steering angle information of the vehicle, and slope sensor information are received, and data output by a millimeter wave radar, a Lidar and a camera is obtained.

Step II: Adaptive Angle Rotation

1) When the planning module continuously outputs vehicle steering angle information, the rotation angle of the sensor is determined combined with the comparison of point cloud information in the drivable area, and the sensor is controlled to rotate at a corresponding angle by the sensor rotation controller.

When the matching degree between the current drivable area and the expected ROI is continuously less than the threshold, namely:

$$\frac{1}{n}\sum_n^1 M_i < M_x, \text{ where}$$

$$M_i = \frac{S_n}{S_p},$$

where i is the current moment, $M_i$ is the matching degree between the current drivable area and the expected ROI, $M_x$ is the matching threshold, $S_n$ is an area of the current drivable area, $S_p$ is an area of the expected ROI.

If the above formula is met, it is considered that the forward sensor meets the steering conditions and steering can be performed.

The steering angle derivation method based on the vehicle safety braking distance is related to the driving road adhesion coefficient and the weather conditions. Because the ground of the mining area is bumpy and the weather is uncertain, the steering angle derived by this method has large fluctuations and is not applicable. The present disclosure uses a steering angle derivation method directly based on the geometric relationship.

It is assumed that when the vehicle turns right, if the left wheel steering angle is $\theta_l$, the right wheel steering angle is $\theta_r$, a steering angle from the sensor to the intersection of the left and right front wheel axes is $\theta_x$, K is the ground wheelbase of the left and right front wheel axles, and L is the ground wheelbase of the front and rear wheel axles on the same side of the vehicle. The distance between the left and right front wheel axles of the vehicle and the sensor is 1, and the sensor should turn at an angle of $\theta$. According to the Ackermann's vehicle steering law, it can be derived that:

$$\cot\theta_1 = \cot\theta_r + \frac{K}{L}.$$

Figure 3:
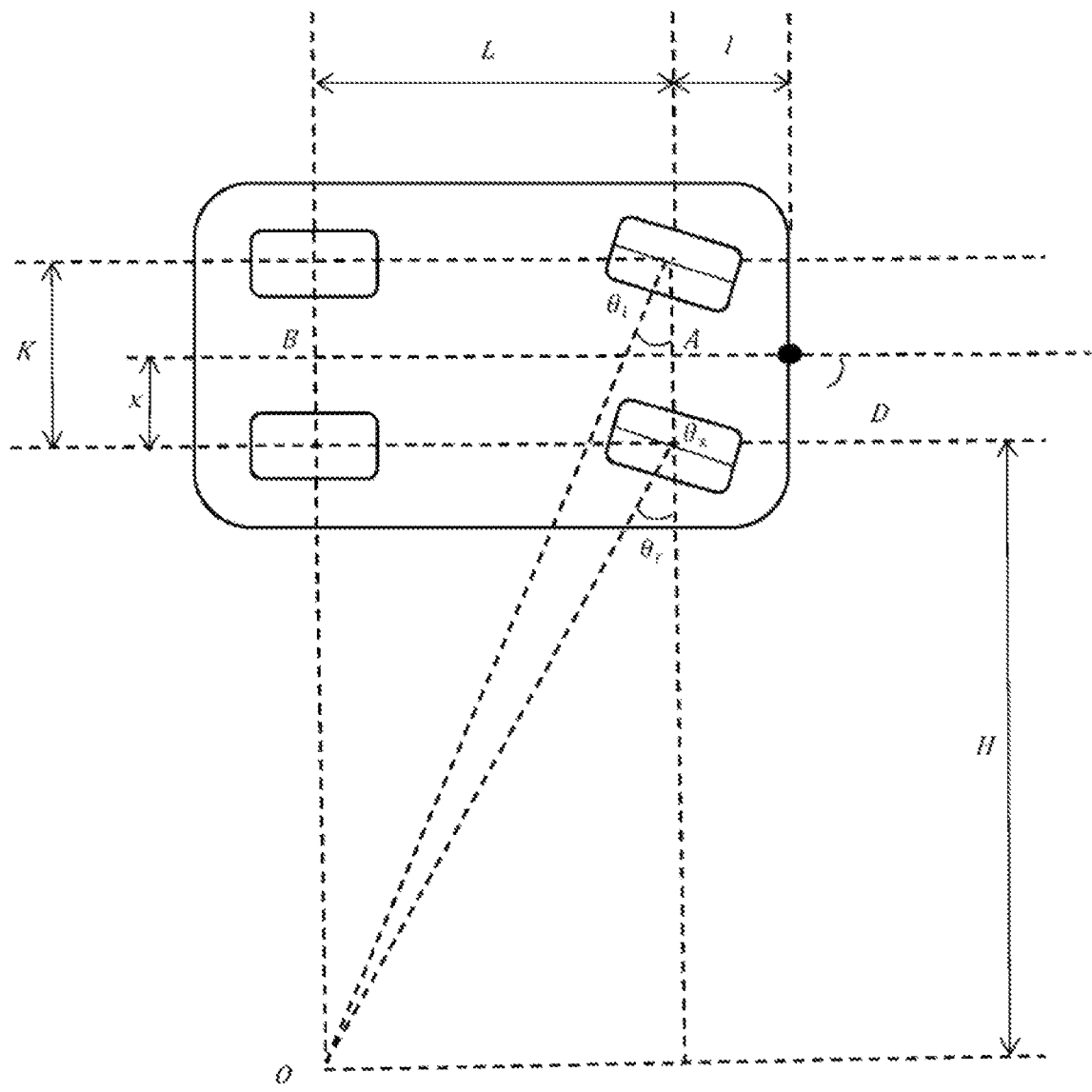
FIG. 3 is a geometric schematic diagram of Ackermann steering.
Figure 6:
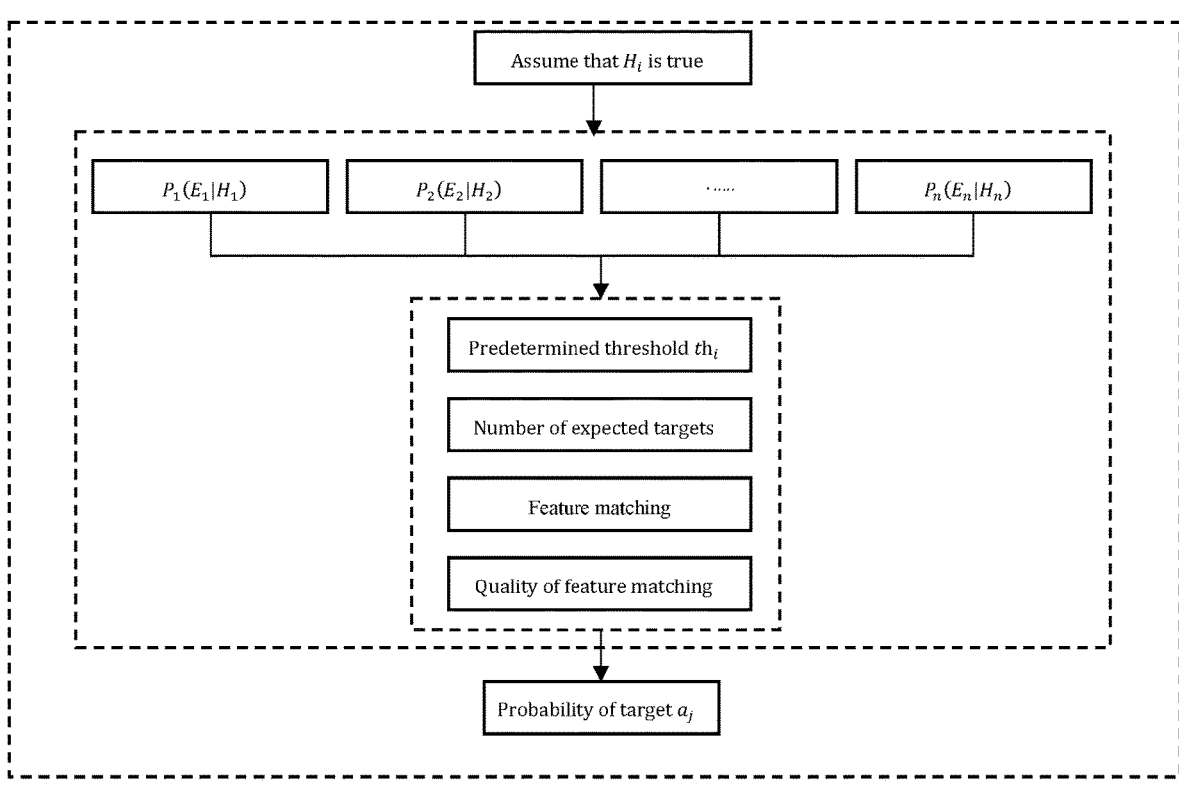
FIG. 6 is a flow chart of the Bayesian algorithm.
Figure 7:
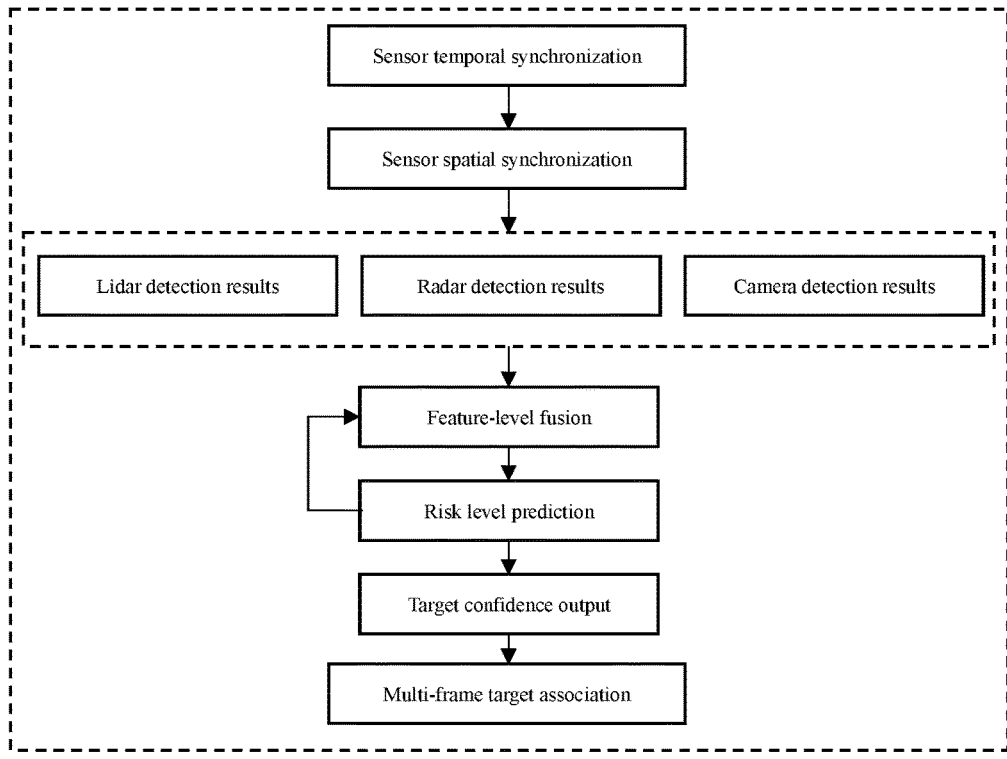
FIG. 7 is a flow chart of the algorithm of the multi-frame target association module.

As shown in FIG. 3:

$$H = \frac{L}{\tan\theta_r}, \text{ and}$$

$$\tan\theta_x = \frac{L}{H+x}.$$

The steering angle from the sensor to the intersection of the left and right front wheel axes $\theta_x$ is $$\tan\theta_x = \frac{L \cdot \tan\theta_r}{L + x \cdot \tan\theta_r}.$$

The turning radius of a corresponding sensor emission source is:

$$R_x = \frac{L}{\sin\theta_x} = \frac{L}{\sin\left(\arctan\left(\frac{L \cdot \tan\theta_r}{L + x \cdot \tan\theta_r}\right)\right)},$$

where

A, B, C—distance from sensor emission source to front left and right wheel axles, distance between rear left and right wheel axles, and position of sensor emission source;

x—distance from sensor emission source to right wheel;

1—distance from left and right front wheel axles to sensor;

L—locomotive axle spacing;

O—instantaneous turning center of locomotive;

H—distance from instantaneous turning center of locomotive to right wheel; and

D—tangent point between axis of sensor and intended track line of corresponding wheel.

Figures 4, 5:
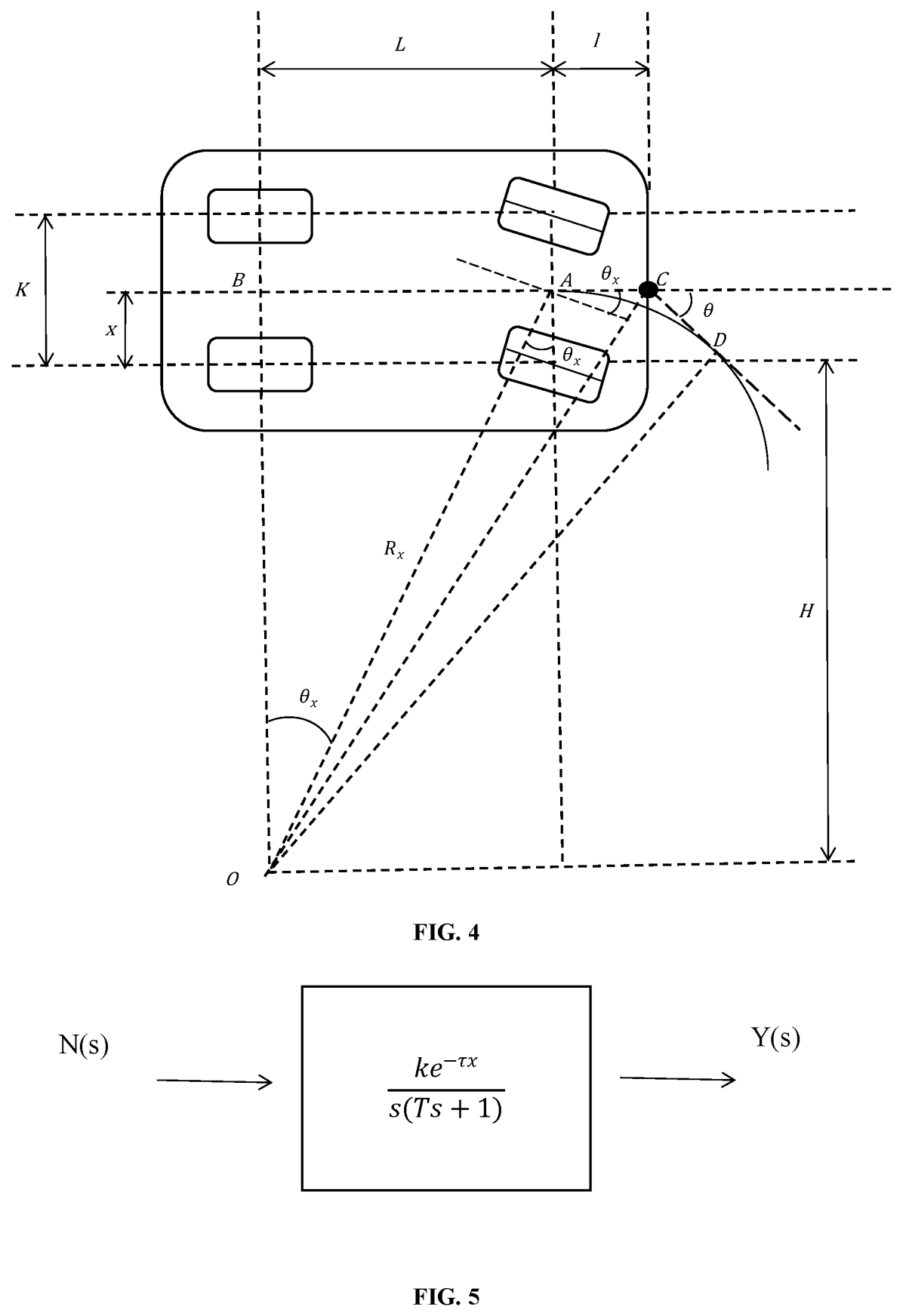

It can be seen from FIG. 4 that:

$$\begin{cases} OD \perp CD \\ OB \perp BC \end{cases}.$$

According to the sum theorem of the interior angles of quadrangles:

$$\angle BCD + \angle BOD = \pi,$$

and:

$$\angle BCD + \theta = \pi,$$

therefore, $$\theta = \angle BOD = \theta_x + \angle AOD = \theta_x + \angle AOC + \angle COD.$$

According to the Pythagorean theorem:

$$OB^2 = OA^2 - AB^2 = R_x^2 - L^2, \text{ and}$$

$$OC^2 = OB^2 + BC^2 = R_x^2 - L^2 + (L+1)^2 = R_x^2 + 1^2 + 2IL,$$

where $R_x$ is the radius from the center of the locomotive turning clockwise to the sensor emission source. For the angle COD:

$$\cos\angle COD = \frac{OA}{OC} = \frac{R_x}{\sqrt{R_x^2 + 1^2 + 2IL}}.$$

For the angle AOC, according to the law of cosine, AC=1:

$$\cos\angle AOC = \frac{OC^2 + OA^2 - AC^2}{2 \cdot OA \cdot OC} = \frac{R_x^2 + 1^2 + 2IL + R_x^2 - 1^2}{2R_x\sqrt{R_x^2 + 1^2 + 2IL}} = \frac{R_x^2 + IL}{R_x\sqrt{R_x^2 + 1^2 + 2IL}},$$

then the sensor steering angle $\theta$ is:

$$\theta = \theta_x + \arccos\left(\frac{R_x^2 + IL}{R_x\sqrt{R_x^2 + 1^2 + 2IL}}\right) + \arccos\left(\frac{R_x}{\sqrt{R_x^2 + 1^2 + 2IL}}\right).$$

According to the perception system, the angle is changed in advance, the delay error is reduced and the time variable t is substituted, the function of the adaptive rotation angle of the sensor can be obtained:

$$R_x\theta(t) = \int V(t)dt,$$

where V(t) is a speed function output by the decision-making and planning module.

It is substituted to obtain the final adaptive rotation angle function of the sensor:

$$\theta(t) = \frac{1}{R_x} \cdot V(t)dt = \frac{1}{L}\sin\theta_x(t)\int V(t)dt.$$

2) When there are slightly large rocks or puddles on the road, or when the vehicle goes down hills under a full load, the vehicle is tilted forward or the center of gravity shifts backward. The slope sensor outputs the slope, and determines the rotation angle of the sensor according to the output slope value. The sensor rotation controller controls the rotation of the sensor to compensate the visual field blind area caused by the pitch angle of the vehicle.

Figure 2:
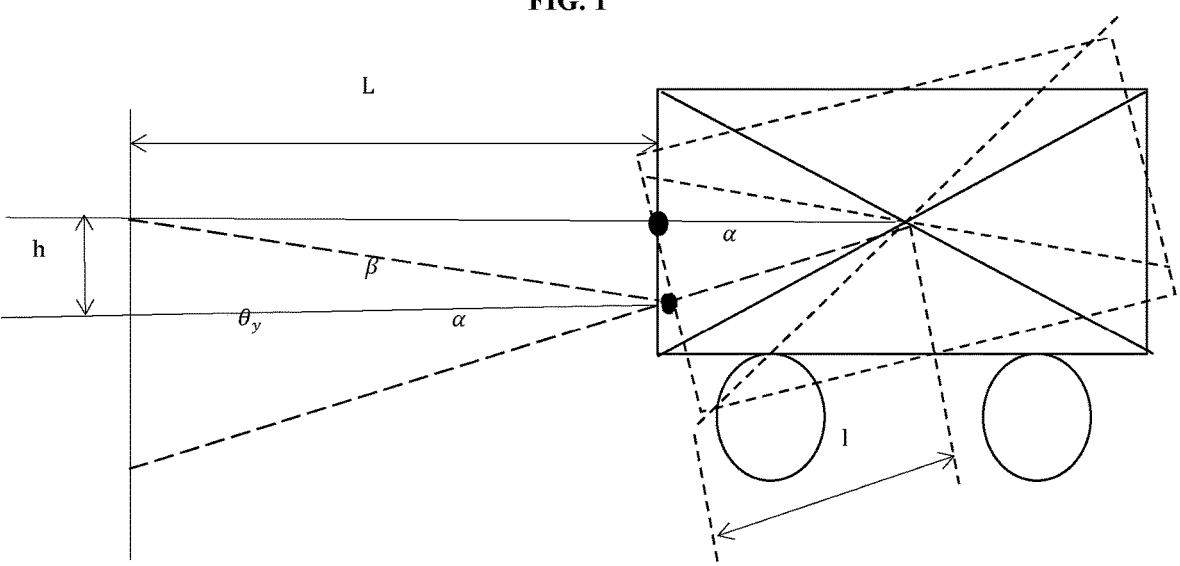
FIG. 2 is a schematic diagram of the influence of a vehicle body pitch angle on a perception range of a sensor.

It can be seen from FIG. 2 that $\theta_y$ is an angle that shall be adjusted for the forward tilt sensor of the vehicle (defined as positive when adjusted upward and negative when adjusted downward), $\alpha$ is the forward tilt angle of the vehicle output by the slope sensor, the position perceived by the sensor decreases accordingly when the center of gravity of the vehicle sinks, and $\beta$ is the included angle between the decline point perceived by the sensor caused by the decline of the center of gravity of the vehicle and an expected perceived position point:

$$\theta_y = -\alpha - \beta.$$

Since $\alpha$ is small, it can be obtained approximatively:

$$\tan\alpha = \frac{h}{w},$$

where h is the height variation of the forward tilt sensor of the vehicle, and w is the horizontal component of the distance between the sensor and the center of gravity of the vehicle.

According to the geometric relation, it can be obtained:

$$\tan\beta = \frac{h}{W}.$$

W is the effective perceived distance of the sensor, so it can be obtained:

$$\theta_y = -\alpha - \tan^{-1}\left(\frac{w \cdot \tan\alpha}{W}\right).$$

The adaptive rotation sensor is driven by a small stepper motor. It is considered that the stepper motor control system is a second-order inertia link plus a pure hysteresis link. A diagram of the stepper motor control system is shown in FIG. 5.

In FIG. 5, N(s) is the input pulse number of the stepper motor control system, and Y(s) is the output angle of the stepper motor control system. A transfer function of the stepper motor control system is:

$$G(s) = \frac{Ke^{-\tau s}}{s(Ts + 1)},$$

where K is the static gain of the system, T is the system time constant, and $\tau$ is the pure lag time.

The mathematical model of the front sensor is established, and the least square method is used for system identification. The mathematical model of the time-invariant dynamic process is assumed to be:

$$A(z^{-1})z(k) = B(z^{-1})u(k) + n(k),$$

where u(k) and z(k) are the input and output of the system, n(k) is noise, and $A(z^{-1})$ and $B(z^{-1})$ are polynomials, where:

$$\begin{cases} A(z^{-1}) = 1 + a_1z^{-1} + a_2z^{-2} + \cdots + \cdot a_nz^{-n} \\ B(z^{-1}) = b_1z^{-1} + b_2z^{-2} + \cdots + \cdot b_mz^{-m} \end{cases}.$$

Using a $\{u(k), z(k); k=1, \ldots, L\}$ sequence, the unknown coefficients in the polynomials $A(z^{-1})$ are $B(z^{-1})$ estimated.

It is defined that:

$$\begin{cases} \theta = [a_1, a_2, \cdots, a_n; b_1, b_2, \cdots, b_m]^T \\ h(k) = [-z(k-1), \cdots, -z(k-n); u(k-1), \cdots, u(k-m)]^T \end{cases},$$

then the mathematical model of the initial time-invariant dynamic process can be converted into a standard least square format:

$$z(k) = h^T(k)\theta + n(k) \quad k = 1, 2, \ldots, L.$$

The above formula can also be written into a linear system of equations, and its matrix format is:

$$Z_L = H_L\theta + N_L,$$

where:

$$\begin{cases} Z_L = [z(1), z(2), \cdots, z(L)]^T \\ N_L = [n(1), n(2), \cdots, n(L)]^T \end{cases}, \text{ and}$$

$$H_L = \begin{bmatrix} h^T(1) \\ h^T(2) \\ \cdots \\ h^T(L) \end{bmatrix} = \begin{bmatrix} -z(0) & \cdots & -z(1-n) & u(0) & \cdots & u(2-m) \\ -z(1) & \cdots & -z(2-n) & u(1) & \cdots & u(2-m) \\ \cdots & \cdots & \cdots & \cdots & \cdots & \cdots \\ -z(L-1) & \cdots & -z(L-n) & u(L-1) & \cdots & u(L-m) \end{bmatrix}$$

then the least square criterion function $J(\theta)$ can be written as:

$$J(\theta) = (Z_L - H_L\theta)I_L(Z_L - H_L\theta),$$

where $I_L$ is a weighted matrix, which is generally taken as a positive definite diagonal matrix. By minimizing $J(\theta)$, the estimated value $\hat{\theta}$ of the coefficient $\theta$ can be obtained:

$$\hat{\theta} = \left(H_L^T H_L\right)^{-1} H_L^T Z_L,$$

where $\hat{\theta}$ is the estimated value of the least square method. After the input and output values of the system are obtained, the estimated value of the corresponding coefficient can be obtained at one time by using the above formula.

In order to establish the mathematical model of the sensor steering angle control system, the least square method is needed for system identification. Therefore, the inverse Laplace transform of the transfer function of the stepper motor control system is required. It is assumed that the input of the vehicle control system is a constant value x, the relationship after Laplace transform can be obtained:

$$y(t) = nK\left(t - \tau - T + Te^{-\frac{t-\tau}{T}}\right),$$

where y(t) is the inverse Laplace transform of Y(s), and n is the number of input pulses of the control system. In order to separate the three undetermined coefficients K, $\tau$ and T, the both ends are integrated to obtain:

$$\int_0^{k\tau s} y(t)dt = \int_0^{k\tau s} nK\left(t - \tau - T + Te^{-\frac{t-\tau}{T}}\right)dt.$$

By setting $$A(kT_s) = \int_0^{k\tau s} y(t)dt,$$

the above formula can be simplified as:

$$nK\left[\frac{1}{2}(kT_s)^2 + \frac{1}{2}\tau^2 - \tau kT_s\right] - Ty(kT_s) = A(kT_s),$$

where $T_s$ is the sampling period and k is a positive integer. Through sorting-out:

$$\left[\frac{1}{2}(lT_s)^2 + \frac{1}{2}n - nkT_s - ykT_s\right]\begin{bmatrix} K \\ k\tau^2 \\ k\tau \\ T \end{bmatrix} = A(kT_s).$$

By setting $$X = \begin{bmatrix} K \\ k\tau^2 \\ k\tau \\ T \end{bmatrix},$$

it is obtained that:

$$B_{km \to L} = \begin{bmatrix} \frac{1}{2}n(mT_s)^2 & \frac{1}{2}n & -nmT_s & -y(mT_s) \\ \frac{1}{2}n[(m+1)T_s]^2 & \frac{1}{2}n & -n(m+1)T_s & -y[(m+1)T_s] \\ \cdots & \cdots & \cdots & \cdots \\ \frac{1}{2}n(LT_s)^2 & \frac{1}{2}n & -nLT_s & -y(LT_s) \end{bmatrix}, \text{where}$$

$$A = \begin{bmatrix} A(mT_s) \\ A(m+1)T_s \\ \cdots \\ A(LT_s) \end{bmatrix},$$

$$BX = A, \text{ and}$$

$$X = \left(B^T B\right)^{-1} B^T A.$$

In the above formulas, the right side of the equal sign is only related to the input and output of the control system and the sampling time, which can be obtained from experiments. The left side of the equal sign is the undetermined coefficient.

The state space model is established, and the transfer function of the stepper motor control system used by the model is:

$$G(s) = \frac{2.93e^{-0.06s}}{1.77s^2 + s}.$$

The procedure for establishing the state space model is as follows:

Nump=[0,0,2.93];
Denp=[1.77,1,0];
Gp=tf(nump,denp);
[nump,denp]=pade(0.06,1); % pure delay part uses a first-order pade approximation
G=Gp*tf(nump,denp); % reconstructs the approximation function
[num,den]=tfdata(G,'v'); % extracts the numerator and denominator polynomial coefficient vector of the approximate transfer function
[A,B,C,D]=tf2ss(num,den); % is converted to the state space model $$\dot{X} = \begin{bmatrix} -33.8983 & -18.8324 & 0 \\ 1 & 0 & 0 \\ 0 & 1 & 0 \end{bmatrix} X + \begin{bmatrix} 1 \\ 0 \\ 0 \end{bmatrix} U$$

$$Y = [0 \ -1.6554 \ 55.1789]X$$

Step III: Euclidean Clustering Extraction-Based Millimeter Wave Radar Detection Target Information Euclidean clustering is performed on a point cloud on a road after ground information is removed from the ROI. Specifically, target points are randomly selected and the target points are put into a cluster if a distance between current points is less than a threshold, otherwise, other points are selected for judgment, the above operations are continuously repeated until there are no points with a distance less than the threshold, and a clustering result is output.

Step IV: Deep Learning Algorithm Extraction-Based Lidar Detection Target Information First, an original point cloud is cut into grids from a perspective of a top view, a 3D point cloud is pillarized, a point cloud in each Pillar is represented by a 9-dimensional vector, and the point cloud is subjected to feature extraction by PointNet to generate a 2D pseudo-image. The pseudo-image is input into a 2D CNN to further extract point cloud features. Finally, BoundingBox regression is performed through an SSD head and a position and orientation of the obstacle are output.

Step V: Deep Learning Algorithm Extraction-Based Camera Detection Target Information An image is enhanced using Mosaic data, and a size and position of a truth value target are changed. The image after Mosaic enhancement is input into the network, the size of the image is unified using a Focus module, deep semantic information and shallow spatial information of the image are extracted through an improved residual network DarkNet, and a category and position of the target are accurately detected under three scales through a feature pyramid network.

(3) Multi-Frame Target Association

Step I: Target Fusion

A detection target list is generated according to single-frame target detection information and target features output by each sensor are fused by a Bayesian method to obtain a consistent interpretation of the target. A likelihood probability $P(E|H_i)$ of an observed feature E of the sensor is calculated when a given hypothesis $H_i$ is true. An observed value is compared with a predetermined threshold $th_i$, a number of expected targets, feature matching and quality of feature matching, and these data is analyzed to determine a value of a likelihood function which represents a confidence of the target $a_j$.

Step II: Risk Level Prediction

A target speed, a vehicle body speed, a tag value, and a position of the target relative to a vehicle body are taken as evaluation criteria. First, a knowledge-based expert system is established. The expert system of the present disclosure includes a knowledge base, a global database and an inference machine. The knowledge base contains established facts, algorithms and heuristic rules, the global database is used to temporarily cache the input, intermediate and output results, and the inference machine is used to infer the risk level of the target.

The expert system inputs all relevant factors into the inference machine which repeatedly infers the relevant target risk level through the algorithm and related rules in the knowledge base, and finally outputs the optimal target risk level. A risk level threshold $h_{th}$ is set. If the risk score of the target output by the expert system is greater than the threshold, the detection risk level is considered high. According to the risk score of the target, the probability $a_j$ of the target is actively updated and fed back to step II to realize the active risk perception function of the target.

If the risk level of the target is greater than the risk threshold:

$$h_i > h_{th},$$

where $h_i$ is the risk level of the target, and $h_{th}$ is the risk level threshold.

The risk level of the target is input into the expert system, and the expert system actively analyzes the target with a risk level greater than the risk threshold to improve the confidence of the target:

$$a_j = a_j + (1 - a_j)h_i,$$

where $a_j$ is the confidence of the target input, and $h_i$ is the risk level improvement coefficient, and is iteratively updated by the expert system by constantly absorbing the prior knowledge.

Further, an embodiment of the present disclosure provides a computer-readable storage medium, storing a computer program thereon. When the program is executed by a processor, the method according to the embodiments of the present disclosure is implemented.

The foregoing describes optional implementations of the embodiments of the present disclosure in detail with reference to the accompanying drawings. However, the embodiments of the present disclosure are not limited to the specific details in the foregoing implementations. Within the scope of the technical concept of the embodiments of the present disclosure, various simple variations can be made to the technical solutions in the embodiments of the present disclosure. These simple variations all fall within the protection scope of the embodiments of the present disclosure.

In addition, it should be noted that various specific technical features described in the foregoing implementations can be combined in any suitable manner, provided that there is no contradiction. To avoid unnecessary repetition, various possible combinations are not separately described in the embodiments of the present disclosure.

Those skilled in the art can understand that all or some of the steps for implementing the method in the foregoing embodiments can be completed by a program instructing relevant hardware. The program is stored in a storage medium, and includes a plurality of instructions to enable a single chip microcomputer, a chip, or a processor to perform all or some of the steps in the method described in each embodiment of the present disclosure. The foregoing storage medium includes: a USB flash disk, a mobile hard disk, a read-only memory (ROM), a random access memory (RAM), a magnetic disk, or an optical disk, and the like, which can store program codes.

In addition, various different embodiments of the present disclosure can also be arbitrarily combined, provided that the combinations do not violate the idea of the embodiments of the present disclosure. The combinations should also be regarded as the content disclosed in the embodiments of the present disclosure.

What is claimed is:

1. An active perception system for a double-axle steering cab-less mining vehicle, the system comprising: at least one processor, a memory storing instructions, when executed by the at least one processor, causing the at least one processor to perform operations comprising:

building a three-dimensional (3D) perception map and extracting a region of interest (ROI) by marking an unstructured road boundary;

detecting single-frame data by Euclidean clustering-based millimeter wave radar detection, depth learning algorithm-based Lidar detection and depth learning algorithm-based camera detection, comprising:

receiving point cloud information of a ROI and speed, inclination and steering angle of the vehicle, and obtaining data output by a millimeter wave radar, a Lidar and a camera;

determining a rotation angle of each sensor according to the steering angle information of the vehicle combined with the point cloud information of the ROI and controlling the rotation angle of each sensor, and determining the rotation angle of each sensor according to an output value of a slope sensor when a vehicle body is tilted or a center of gravity shifts and compensating a visual field blind area caused by a pitch angle of the vehicle;

performing Euclidean clustering on a point cloud on a road after ground information is removed from the ROI, wherein performing Euclidean clustering on the point cloud on the road comprises:

randomly selecting target points, and when a distance between the target points is less than a threshold, putting the target points into a cluster until there are no points with a distance less than the threshold, and outputting a clustering result;

cutting an original point cloud into grids from a perspective of a top view, pillarizing a 3D point cloud, representing a point cloud in each Pillar by a 9-dimensional vector, inputting the point cloud into a PointNet feature extraction network to generate a two-dimensional (2D) pseudo-image, inputting the pseudo-image into a 2D convolutional neural network (CNN) to further extract point cloud features, performing BoundingBox regression through a single-shot detector (SSD) head and outputting a position and orientation of the obstacle; and enhancing an image using Mosaic data, changing a size and position of a truth value target, inputting the enhanced image into the network, unifying the size of the image, extracting deep semantic information and shallow spatial information of the image through a residual network, and detecting a category and position of the target;

predicting a risk index of each detection target by calculating an information entropy of each sensor and acquiring indicators comprising a mark, speed and distance of the target, and determining a state of an obstacle after the risk index feeds back on the information entropy;

receiving perceived environmental data;

determining a new speed, inclination and steering angle of the vehicle through a corresponding planning algorithm for vehicle control, and feeding back the new speed, inclination and steering angle of the vehicle to control a rotation direction of each sensor adaptively, so as to increase an effective perception and detection range; and actively adjusting the vehicle to a forward advancing mode and a backward advancing mode according to a driving mode and comprehensive information of each sensor.

2. The active perception system according to claim 1, wherein the double-axle steering autonomous driving mining vehicle has the forward advancing mode and the backward advancing mode: in the forward advancing mode, a sensor at the front of a vehicle body is configured as a main sensor, and the forward advancing mode is started when the vehicle moves from a loading area to an unloading area under a full load; and in the backward advancing mode, a sensor at the rear of the vehicle body is configured as a main sensor, and the backward advancing mode is started when the vehicle moves from the unloading area to the loading area under a no-load state.

3. The active perception system according to claim 1, comprising a forward sensor component and a backward sensor component with the same configuration, wherein each of the sensor components comprises at least a slope sensor, a global navigation satellite system/inertial measurement unit (GNSS/IMU), a Lidar, a camera, a millimeter wave radar, and a rotation angle receiving module and rotation angle control module of each sensor.

4. The active perception system according to claim 1, wherein two sets of Lidars, millimeter wave radars and cameras are arranged at the front and rear of a double-axle steering autonomous driving mining vehicle body, and a GNSS/IMU and a slope sensor are arranged on the vehicle body, and wherein, building the three-dimensional (3D) perception map and extracting the region of interest (ROI) by marking the unstructured road boundary comprises:

calibrating the Lidar and the GNSS/IMU to obtain the positioning relationship between a vehicle body coordinate system and a world coordinate system;

establishing a local world map with a global positioning system (GPS) of a first waypoint as an origin, determining a conversion matrix by Lidar and vehicle GNSS/IMU calibration information, converting GPS information of a point cloud at every moment into the world coordinate system, and performing front-end iterative closest point (ICP) matching and back-end extended Kalman filter (EKF) optimization processing on the point cloud to form a local point cloud map; and extracting the unstructured road boundary based on a point cloud normal vector, distinguishing a vertical ground normal vector and an inclined retaining wall normal vector, and extracting a driving boundary through orientation features of the normal vector, so as to generate a drivable area.

5. The active perception system according to claim 1, wherein predicting the risk index of each detection target by calculating the information entropy of each sensor and acquiring the indicators comprising the mark, speed and distance of the target, and determining the state of an obstacle after the risk index feeds back on the information entropy comprises:

generating a detection target list according to single-frame target detection information and fusing target features output by each sensor by a Bayesian method to obtain a consistent interpretation of the target, calculating a likelihood probability $P(E|H_i)$ of an observed feature E of the sensor when a given hypothesis Ha is true, comparing an observed value with a predetermined threshold $th_i$, a number of expected targets, feature matching and quality of feature matching to determine a value of a likelihood function which represents a detection confidence of the target $a_j$; and taking a target speed, a vehicle body speed, a tag value, and a position of the target relative to a vehicle body as evaluation criteria, establishing an expert system, comprising a knowledge base, a global database and an inference machine, for repeatedly inferring a detection risk level of the target, and considering that the detection risk level is high and actively updating the detection confidence of the target $a_j$ if a risk score of the target output by the expert system is greater than a risk level threshold.

* * * * *